F. A. RYTHER.
FEED GRINDER.
APPLICATION FILED OCT. 11, 1913.

1,250,358.

Patented Dec. 18, 1917.
3 SHEETS—SHEET 1.

Witnesses:
F. W. Hofmeister

Inventor.
Frank A. Ryther,
By Chas. E. Lord
Atty.

F. A. RYTHER.
FEED GRINDER.
APPLICATION FILED OCT. 11, 1913.

1,250,358.

Patented Dec. 18, 1917.
3 SHEETS—SHEET 2.

Witnesses:

Inventor.
Frank A. Ryther,
By Chas. E. Lord
Atty.

F. A. RYTHER.
FEED GRINDER.
APPLICATION FILED OCT. 11, 1913.

1,250,358.

Patented Dec. 18, 1917.
3 SHEETS—SHEET 3.

Witnesses:

Inventor.
Frank A. Ryther,
By Chas. E. Lord
Atty.

UNITED STATES PATENT OFFICE.

FRANK A. RYTHER, OF CHICAGO, ILLINOIS, ASSIGNOR TO INTERNATIONAL HARVESTER COMPANY OF NEW JERSEY, A CORPORATION OF NEW JERSEY.

FEED-GRINDER.

1,250,358. Specification of Letters Patent. Patented Dec. 18, 1917.

Application filed October 11, 1913. Serial No. 794,627.

*To all whom it may concern:*

Be it known that I, FRANK A. RYTHER, a citizen of the United States, residing at Chicago, in the county of Cook and State of Illinois, have invented certain new and useful Improvements in Feed-Grinders, of which the following is a full, clear, and exact specification.

My invention relates to feed grinders. Difficulty has heretofore been experienced in grinding Kafir corn due to the character of the heads, the kernels being carried on a long head which is comparatively light and difficult both to catch in the ordinary feeder mechanism of a grinder and to feed after the same has been brought thereto. The result of this has been that there has been a tendency for the heads to lodge in the top of the hopper while the feeder mechanism rotated ineffectually below them, the effectiveness of the machine being thus destroyed.

My invention has for its object to provide an improved grinder especially adapted to use in connection with Kafir corn whereby the heads are drawn out of the hopper and then beaten and broken in such a manner as to eliminate all choking and maintain a constant supply to the grinding mechanism. I attain this object by the provision of improved feeding and breaking mechanism for the grinder, this breaking mechanism coöperating with the feeding and grinding mechanism of the grinder in an improved manner and being itself specifically improved as hereinafter set forth.

In order that my invention may be clearly and fully disclosed, I have shown in the accompanying drawings two embodiments which the same may assume in practice. It is to be understood, however, that the forms shown herein for purposes of illustration may be modified.

Figure 1:
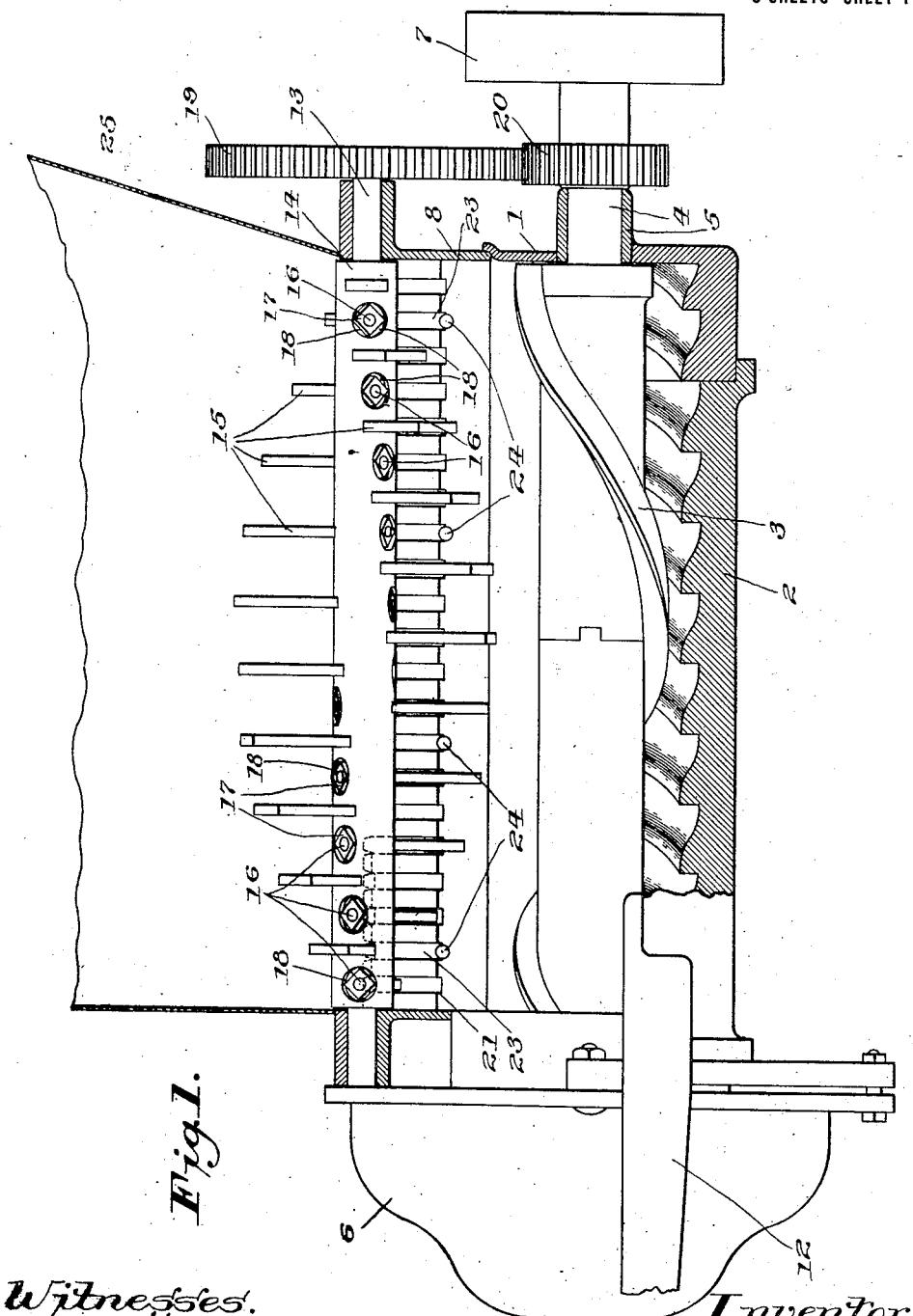
Figure 1 is a side elevation of the grinder with a portion of the casing in section.
Figure 2:
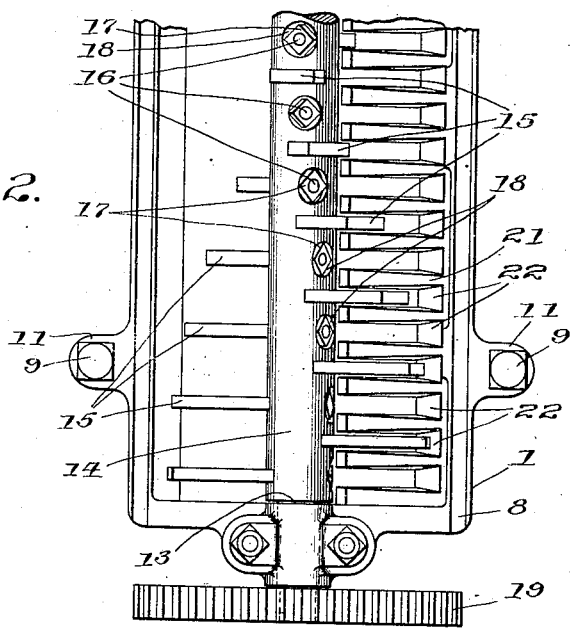
Fig. 2 is a top plan view of the breaking mechanism shown in Fig. 1.

In the construction shown I have illustrated a grinder 1 of standard construction comprising a corrugated bottom plate 2, a spirally arranged feeding roll or rib 3 carried on a longitudinally extending shaft 4 journaled in bearings 5 in the ends of the frame above the plate 2, and grinding mechanism 6 of the well known vertical grinding plate type disposed at one end of the frame 1 and outside the same and driven from any suitable source of power through a power pulley 7 carried on the end of the shaft 4.

Figure 6:
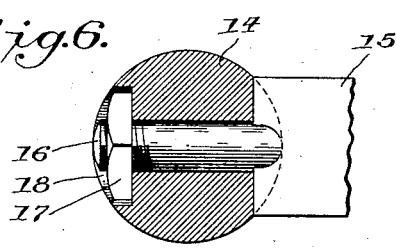
Fig. 6 is a detail view partially in section showing the means for attaching one of the breaking teeth.
Figure 7:
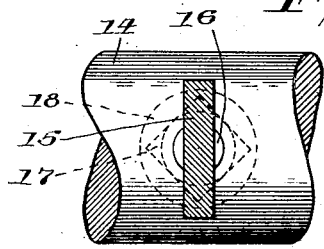
Fig. 7 is an end elevation of one of the teeth attached to the breaker shaft.

Carried upon the top of the grinder frame 1 is a supplemental boxlike frame 8 bolted to the bottom frame by means of a plurality of vertically extending bolts 9 which pass through lugs 10 and 11 in the frames 1 and 8 respectively and at the same time serve to attach the latter to the grinder base 12. Journaled in this frame 8 is a longitudinally extending shaft 13 disposed in a plane above the shaft 4 and provided with a portion 14 of enlarged diameter on which are mounted a plurality of series of radially extending vanes or teeth 15 disposed in spiral form around the portion 14 in such a manner as to form a continuous spiral effect. As shown in Figs. 1, 6 and 7, these teeth are substantially oblong in shape and project a substantial distance beyond the periphery of the portion 14, being slightly countersunk at the inner ends in transverse slots in the body of the shaft and provided with shanks of smaller cross section in the form of bolts 16 which extend through diametrically disposed openings in the portion 14 and are secured thereto by nuts 17 seated in countersunk portions 18 on the opposite surface of the shaft and between the teeth of the next series. As shown in Fig. 1, this breaker shaft 13 is driven in a counterclockwise direction through a large gear 19 carried on one end thereof outside the frame 8, which meshes with a smaller gear 20 carried on the shaft 4 at a point intermediate the spiral feeding rib 3 and the power pulley 7.

Figure 3:
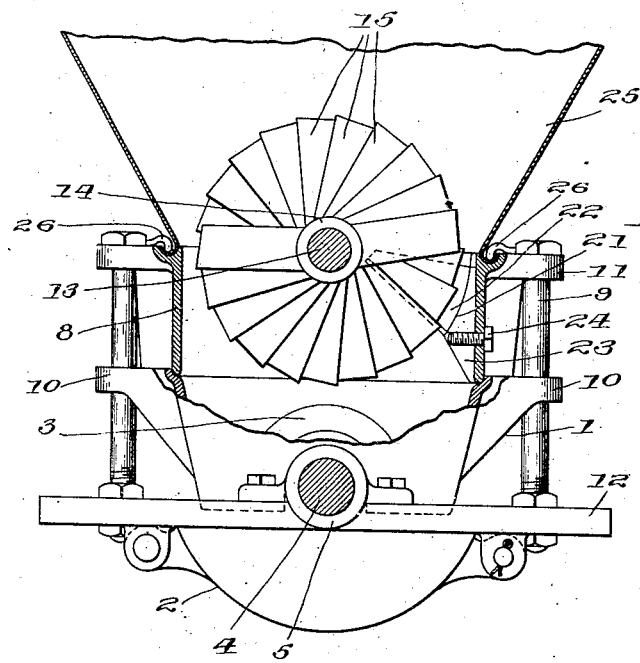
Fig. 3 is an end elevation of the construction shown in Fig. 1 with the casing and gearing mechanism broken away.

Coöperating with the teeth 15 is a grate or grid 21 which is provided with a plurality of teeth spaced apart from each other by a sufficient interval to permit the teeth 15 to pass between the same. It is to be noted that the end walls of the slots on this grid 21 are downwardly and inwardly slanted at 22 in such a manner as to conform to the path of the teeth 15 and that the side walls thereof are enlarged at a point adjacent the ends of the teeth in such a manner as to give a good clearance, while the opposite ends of the slots therein are narrower and extend into close proximity to the periphery of the tooth carrying member 12 and the surface of the teeth 15. In the form shown herein this grid is of integral construction, being formed of a single piece of metal of substantially triangular cross section, the depth of the teeth being greater toward the inner end of the same where the work is done (Fig. 3) and the stock from which they protrude being provided with a downwardly extending portion or flange 23 which is bolted at 24 to the inside of the frame member 8. As in the usual construction a hopper 25 is carried upon the top of the frame 8 and removably attached thereto by means of clips 26 held in position by the bolts 9.

Figure 4:
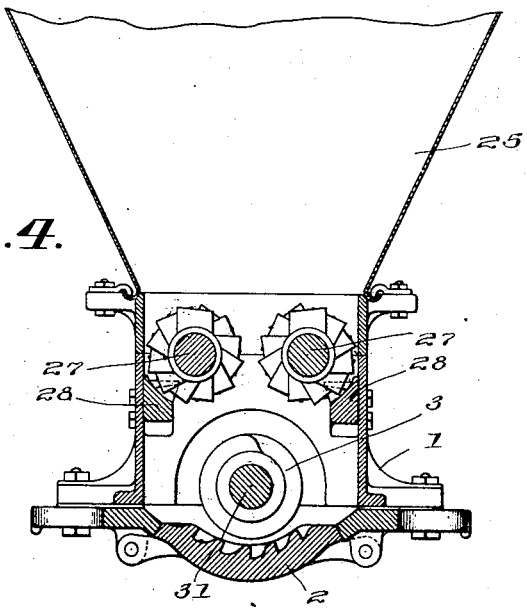
Fig. 4 is a view similar to Fig. 3 showing a modified form of the construction.
Figure 5:
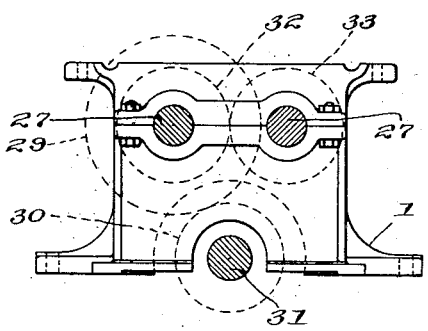
Fig. 5 is a detail view showing the driving mechanism for the construction shown in Fig. 4.

In Figs. 4 and 5 I have shown a modified form of the construction shown in Fig. 1 especially adapted to use in smaller mills wherein the grinding mechanism *per se* is the same as that heretofore described, but a plurality of breaking rolls 27 is employed instead of the one roller shown in Fig. 1. As shown in Fig. 4, these breaking rolls are smaller than that heretofore described and of the same general construction. They are, however, rotated in opposite directions, coöperating in this instance with a plurality of grids 28 carried on the grinder frame *per se* and positioned in this construction at points below their location in the form of my invention first described. As in the previous construction, these breaking rolls are operatively connected to the driving mechanism for the grinder proper, (diagrammatically illustrated in Fig. 5) a suitable large gear 29 meshing with a smaller gear 30 on the main driving shaft 31 to drive the shaft of the left hand roll 27, which in turn carries a smaller gear 32, meshing with a gear 33 on the shaft of the right hand roll.

In the operation of the construction shown (Fig. 1) the material in the hopper is caught by the teeth of the breaker as the latter rotates in a counterclockwise direction and pulled downward beneath the breaker roll and within the feeding chamber, the spiral arrangement of the teeth causing the same to be delivered thereto in a constant volume. This action results in threshing off some of the kernels and delivering some of the heads to the feed roller. Further, the continued rotation of the breaker in an upward direction through the grids carries as much of the heads as has not already been acted upon by the feed roll 3, upward against the grid 21 in such a manner as to break the stalks into short lengths and permit the same to drop back upon the spiral feeder, which then carries the same toward the grinding mechanism. Attention is further directed to the fact that due to the spiral arrangement of the teeth on the breaker, the heads are not only taken from the hopper evenly and continuously in such a manner that a continuous feed to the feeding chamber is maintained, but that the stalks are broken in the same continuous manner, thus insuring an even supply of material to the feeder and the grinding mechanism. It is also to be noted that due to the provision of the coöperating grid and teeth means are provided which effectually prevent the material from adhering to the beater and again being carried around with the latter in such a manner as to choke the machine and interfere with its operation and maximum efficiency. Obviously, the same results will be obtained in the construction shown in Figs. 4 and 5, the two rolls in this instance moving toward each other and tending to carry the grain downward in the same manner, and the grids likewise preventing the escape of the grain from the chamber and assisting in the breaking operation.

While I have in this application described two embodiments which my invention may assume in practice, it is to be understood, however, that the forms shown herein for purposes of illustration may be modified without departing from the spirit of my invention.

What I claim as my invention and desire to secure by Letters Patent is:

1. In a feed grinder, a feed hopper, feeding mechanism located beneath the same, a grid intermediate said hopper and feeding mechanism, and a toothed breaking cylinder operating in said hopper, drawing material therefrom into close proximity to said feeding mechanism and breaking said material on the under side of said grid.

2. In a feed grinder, a frame having a feed chamber therein, feeding mechanism carried in said chamber, a breaking roll journaled in said chamber above said feeding mechanism, a coöperating breaking grid fixed to the side wall of said chamber above said feeding mechanism and at one side of the same, a feed hopper carried on said frame above said roll and grid and means for rotating said roll whereby material delivered upon the top of the same is drawn down from said hopper to said feeding mechanism and any material remaining on the roll is broken against the under side of said grid.

3. In a feed grinder, a frame, a hopper carried thereon, a spiral feeding rib journaled in said frame receiving material from said hopper, a breaking roll having a plurality of spirally arranged spaced teeth projecting from its periphery and rotatably mounted between said feeding rib and hopper having its teeth projecting into the bottom of said hopper, a breaking grid carried on said frame at one side of said roll and above said feeding rib having its teeth projecting into the interval between the teeth on said roll, and means for breaking material fed into the hopper against the under side of said grid.

4. In a feed grinder, a casing, a hopper carried thereon, a breaking roll journaled in said casing having a plurality of spirally arranged teeth projecting from its periphery, a breaking grid carried on said casing at one side of said roll having its teeth projecting into the intervals between the teeth on said roll, means for rotating said breaking roll whereby the latter draws down the material from said hopper into the bottom of said casing and on its up stroke breaks the same against the under side of said grid, a coöperating casing forming a support for said first mentioned casing, a conveyer in said second casing for conveying away the broken material, and means for rigidly connecting said casings.

In testimony whereof I affix my signature, in the presence of two witnesses.

FRANK A. RYTHER.

Witnesses:
 ROLAND HILL,
 J. B. EVANS.

Copies of this patent may be obtained for five cents each, by addressing the "Commissioner of Patents, Washington, D. C."